United States Patent [19]

Kaspe

[11] Patent Number: 4,525,319

[45] Date of Patent: Jun. 25, 1985

[54] METHOD AND APPARATUS FOR FORMING A SINGLE FLANGE PIPE ADAPTER

[75] Inventor: Paul E. Kaspe, Ardrossan, Canada

[73] Assignee: Prolite Plastics Limited, Edmonton, Canada

[21] Appl. No.: 539,679

[22] Filed: Oct. 6, 1983

[30] Foreign Application Priority Data

Apr. 27, 1983 [CA] Canada .................................. 426835

[51] Int. Cl.³ ................................................ B29C 1/00
[52] U.S. Cl. .................................... 264/322; 264/285; 264/339; 264/346; 425/392
[58] Field of Search ............... 264/322, 280, 285, 295, 264/339, 346; 425/392, 394

[56] References Cited

U.S. PATENT DOCUMENTS

| 4,156,710 | 5/1979 | Carroll et al. | 264/322 |
| 4,215,087 | 7/1980 | Mathison | 264/322 |
| 4,383,966 | 5/1983 | Svetlik | 264/322 |

FOREIGN PATENT DOCUMENTS

| 745073 | 10/1966 | Canada . |
| 784608 | 5/1968 | Canada . |
| 1112413 | 11/1981 | Canada . |

Primary Examiner—Paul Lieberman
Assistant Examiner—Willie Thompson
Attorney, Agent, or Firm—Wenderoth, Lind & Ponack

[57] ABSTRACT

There is described a process and apparatus for flaring the end of a thermoplastic tube to form a flange thereon to provide a flanged adapter for joining sections of plastic pipes. An end portion of a tube of suitable thermoplastic resin is heated to soften it and is then placed in a flanged sleeve with the heated tube end projecting from the sleeve. A flanged male plug is inserted into the heated end of the tube and the plug is pushed by means of a press into the tube to cause the flanged plug to flare the heated end of the tube outwardly through an obtuse angle against the flange of the sleeve so that a flange is formed on the tube. A cylindrical member embraces the flanges of plug and sleeve and limits outer flow of the formed tube flange. The tube is then cooled in situ in the press, is removed from the press after cooling and placed in a cold water tank for further cooling. After cooling, the flanged tube is constrained between top and bottom clamping disks and is reheated to about 160° F. and then cooled at the rate of 10° F. an hour until the flared tube is cooled to about 72° F. Thereafter the tube is permitted to stand for a further 48 hours, or so, and is then machined.

18 Claims, 7 Drawing Figures

METHOD AND APPARATUS FOR FORMING A SINGLE FLANGE PIPE ADAPTER

BACKGROUND OF THE INVENTION

The present invention relates to a process and apparatus for flaring the end of a thermoplastic tube to form a flange thereon.

Flanged adapters for joining sections of plastic pipes have been proposed in the past. These adapters are fused onto plastic pipe ends and then the flanged pipe ends are connected together by bolting in conventional fashion. An example of a flanged adapter is seen in Canadian Pat. No. 1,112,413, issued to Phillips Petroleum Company on the 17th of Nov. 1981. The flange of this prior device however is a double flange and the fact that part of the flange is rolled back on itself produces an invisible interface which may hide ripples created when the material is rolled over. Such ripples would weaken the flange.

Adapters having single flare flanges have been manufactured, in the past, by machining plastic rod but this process is costly.

The present invention seeks to provide a flanged adapter which is both economical to manufacture and devoid of invisible interfaces.

SUMMARY OF THE INVENTION

According to the present invention there is provided a process for manufacturing a single flare flange adapter from a length of suitable thermoplastic resin tube, which process comprises the steps of, heating an end portion of the tube to soften it; arranging the tube in a sleeve member with the heated tube end projecting therefrom; inserting a flanged male plug member into the heated end of the tube and moving the sleeve member and the plug member longitudinally towards each other under pressure to cause the flanged plug member to flare the heated end of the tube outwardly through an obtuse angle against a limiting means to form a flange on the tube; cooling the formed flanged tube removing the flanged tube from the members; and stress relieving the flanged tube.

Conveniently this cooling of the flange tube takes place initially whilst pressure is applied and whilst the flanged tube is still engaged between sleeve and plug members and subsequently after removal of pressure and removal of the flanged tube from sleeve and plug members.

Preferably the subsequent cooling is performed by immersing the flanged tube and members in a cold water tank.

In a preferred form of the process the outward flaring of the tube results in the formed flange being overbent by between substantially 15° and 30° beyond a plane normal to the longitudinal axis of the tube.

Again, preferably the stress relieving step may comprise constraining the flanged tube between top and bottom clamping discs and heating the flanged tube to a first temperature above ambient and below the softening point of the tube and permitting the clamped tube to cool gradually by steps until the flared tube is stress relieved. Conveniently the cooling may be conducted by steps of 10° F. an hour and in one preferred embodiment the first temperature is about 160° F. and the flanged tube is cooled to a temperature of about 72° F. over a period of about 8 hours. After stress relieving, it is preferred that the flanged tube be permitted to stand for about 48 hours before it is machined. Again according to a preferred feature of the process the overbent flange is constrained by the clamps at an overbend between 15° and 30° beyond a plane normal to the longitudinal axis of the tube during the stress relieving process.

The present invention also provides an apparatus for forming a single flare flange on a heated end of a thermoplastic tube comprising a flanged sleeve member for receiving the tube with the heated end thereof projecting from the sleeve, a flanged male plug member dimensioned so as to enter, in operation, the heated end of the tube and by relative inward longitudinal movement between sleeve and plug to flare the heated end of the tube outwardly between the flanges of the sleeve and plug; and an outer retaining member adapted to embrace the flanges of plug and sleeve and, in operation, limit the outward flow of the tube flange being formed, beyond the edges of the flanges of sleeve and plug.

In a preferred form of apparatus the top face of the flange of the sleeve member receeds outwardly from the sleeve mouth at an angle of between substantially 15° and 30° beyond a plane normal to the longitudinal axis of the sleeve and according to a further preferred feature of the invention the underface of the flange of the plug member is tapered outwardly forwardly from the plug body at an angle of between about 15° and 30° beyond a plane normal to the longitudinal axis of the plug. It is desirable that the outer retaining ring member be of circular cylindrical form of a diameter slightly greater than the outer diameter of sleeve and plug flanges.

DESCRIPTION OF THE DRAWINGS

The following is a description by way of example of an embodiment of the invention reference being had to the accompanying drawings in which.

DESCRIPTION OF PREFERRED EMBODIMENT

Figure 1:
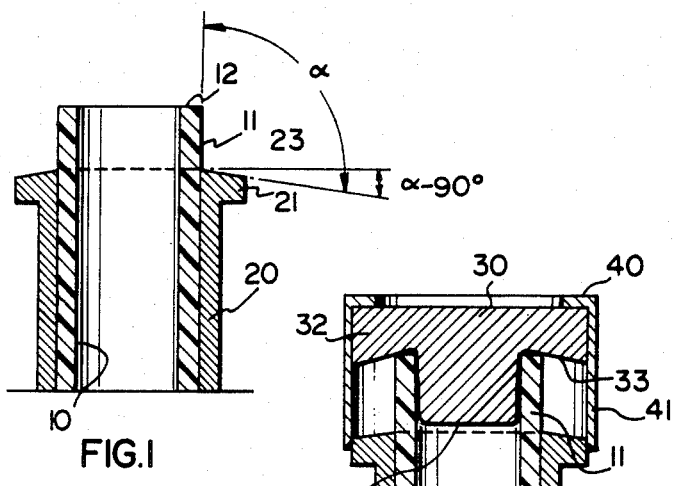
FIGS. 1 to 6 inclusive are views schematically illustrating various stages during the manufacture of a single flare flange adapter from a thermoplastic pipe and of different portions of the apparatus.
Figure 2:
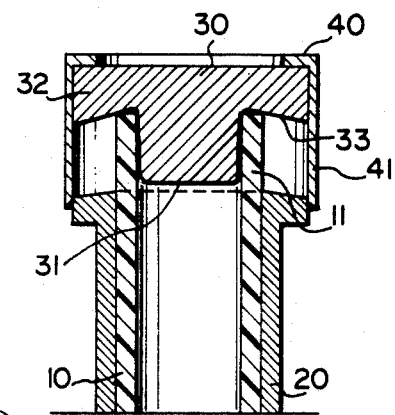
Figure 3:
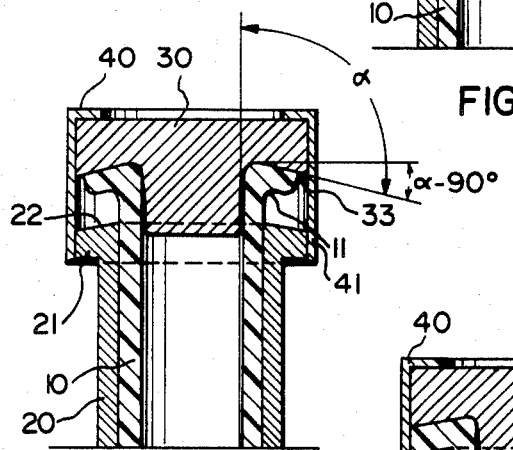

Turning now to the drawings. A piece of thermoplastic resin pipe 10 has its end portion 11 heated so as to soften a desired portion of the pipe. Suitable thermoplastic resin pipes are well known in the art an examples of suitable resins include polyethylene, polypropylene, polybutylene and a copolymer of ethylene and a small proportion, namely of about up to 10% by weight, of a mono-1-olefin having three to eight carbon atoms. It is preferred to employ high density polyethylene (HDPE) or polybutylene. Any suitable size of pipe may be used for this process however extruded pipes having an outside diameter of about 2 inches (5 centimeters) to about 48 inches (120 centimeters) and a wall thickness of about 0.20 inches (0.50 centimeters) to about 3.0 inches (7.5 centimeters) are quite suitable for various commercial applications.

The temperature and the timing of the heating vary depending on the nature and/or the thickness of the thermoplastic resin used. The temperature should be high enough to soften the desired portion of the pipe but should not be high enough to melt the resin to a point where it will deform naturally. Heating in a glycol bath has been found suitable, although other baths such as oil baths may also be useful. Where polyethylene is employed heating in a glycol bath at 270° F. to 285° F. (132° C. to 141° C.) for about 30 to 40 minutes have been found to be practical for middle sizes. In a typical example of manufacturing a 12" diameter flange adapter from series 100 polyethylene DP1600, the heating time in a glycol tank at 280° F. would be 36 minutes. The heated pipe is arranged, as seen in FIG. 1, in a sleeve member 20 with the heated end 11 of the tube 10 projecting upwardly from the sleeve 20. The sleeve 20 has a flange 21 at its upper end. The top face 23 of the flange 21 receeds outwardly from the sleeve mouth and forms an angle ($\alpha$) with the vertical and an angle ($\alpha$-90°) with a plane normal to the longitudinal axis of the sleeve. The angle ($\alpha$-90°) is preferably between substantially 15° and 30°. The sleeve 20 and tube 10 with its heated portion 11, are arranged in a press, on the ram of which is provided a flanged male plug member 30. The nose 31 of the plug 30 is shaped and dimensioned so as to be able to enter into the heated tube 11 and the flange 32 of the plug member 30 is provided with an outwardly directed forward tapered face 33. This taper forms the same angle ($\alpha$) with the vertical and the same angle ($\alpha$-90°) with a plane normal to the longitudinal axis with the plug. The angle ($\alpha$-90°) is preferably between 15° and 30°. Surrounding the plug 30 (or, if desired integral with the plug 30) is an outer retaining member 40 having a cylindrical wall 41 the inner diameter of which is very slightly greater than the outer diameter of the flange 32 of the plug and of the flange 21 of the sleeve.

When the press is actuated the nose of the plug 30 enters the heated portion 11 of the thermoplastic tube 10 and the tapered flange 33 of the plug 30 encounters the softened portion 11 of the tube and as relative axial movement between plug 30 and sleeve 20 continues, the outer extremity 12 of the heated portion of 11 is caused to be flared outwardly through the angle $\alpha$. Outward flow of the heated tube is limited by means of the cylindrical wall 41 of the retaining member 40 and by the rearwardly angled top face 23 of the flange 21 of the sleeve 20. If it is desirable to produce a flange 14 (FIG. 4) on the pipe of a thickness greater than its wall thickness, then the amount of heated portion of 11 of pipe 10 protruding beyond the flange 21 of sleeve 20 and the length of stroke of plug 30 are appropriately selected.

Figure 4:
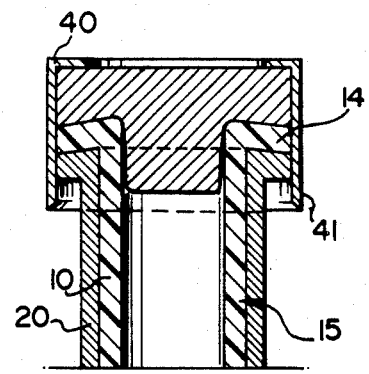
Figure 5:
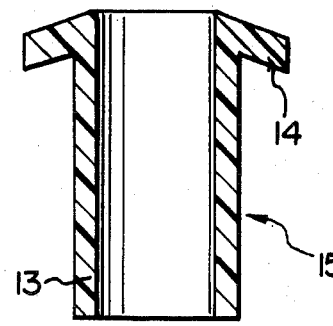

The flanged tube 15 is formed, as seen in FIG. 4, and while the press pressure is maintained, the sleeve 20, plug 30, retaining member 40 and flanged tube 15 are cooled (in situ) by spraying cold water on them for about half to two hours, depending on the nature and size of tube. After this initial cooling, the flanged tube 15 is removed from the assembly of sleeve 20, plug 30, and member 40 and is immersed in a cold water tank to continue cooling for, again depending upon the nature and size of the tube, say, between eight and twenty-four hours. Conveniently the tank temperature may be, say, 40° F. to 50° F. (4.4° C. to 10° C.). The flanged tube 15 is then removed from the sleeve 20, plug 30 and member 40.

Figure 6:
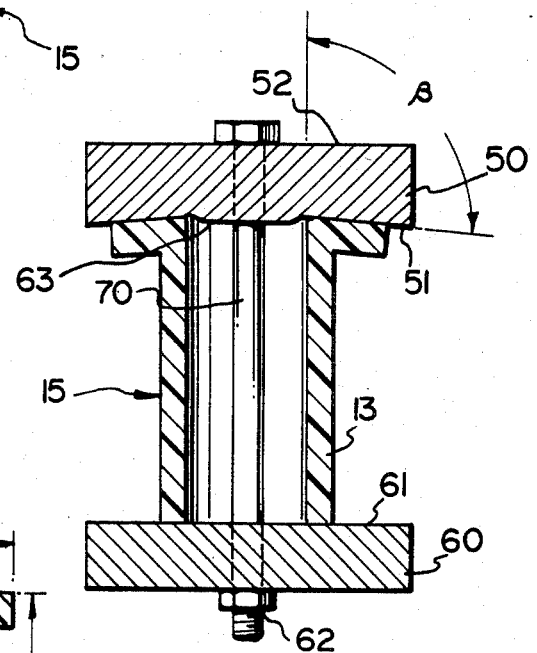

After cooling the flanged tube 15 is clamped between top and bottom clamping disks 50, 60, of a clamp (see FIG. 6) and held therein by a bolt 62. The under face 51 of the top disk 50 is tapered outwardly and forwardly and forms at an angle $\beta$ similar to the previous angle $\alpha$ with the vertical. A centering protrusion 63 is provided on the underface 51 of the flange 50.

The thus clamped flanged tube 15 is then placed in a preheated oven so as to stress relieve it. The temperature of the oven will vary upon such factors as the thickness of the pipe, the kind of resin used and so on but it should be substantially higher than ambient temperature and lower than the softening temperature of the material. Temperatures from about 130° F. to about 200° F. (about 54° C. to about 93° C.) are useful for most plastics. In the present example of the process, the oven is preheated to 160° F. (about 71° C.) and maintained at that temperature for about one hour after the flanged tube 15 and clamp have been placed in the oven. The oven temperature is then lowered by some 6° F. to 15° F., and preferably about 10° F. for a further hour. The stress relieving steps continue at a rate of about 10° F. an hour until the flanged tube 15 reaches a temperature of about 72° F. after a period of about 8 hours.

Figure 7:
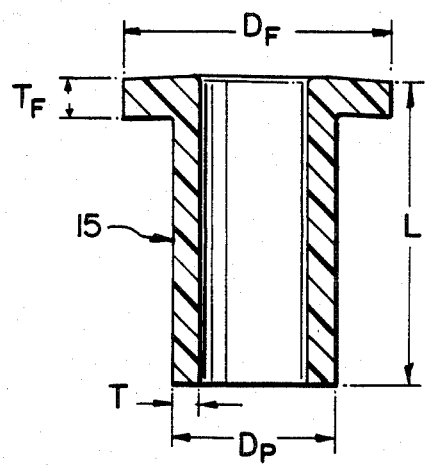
FIG. 7 is a sectional view of the adapter produced in the apparatus and following the process illustrated in FIGS. 1 to 6.

The tube 15 is then removed from the clamps and appears substantially as indicated in FIG. 7 although it is usual for some of the overbending of the flange to be reduced during stress relieving.

Thereafter the tube is permitted to rest for a period of, say, another 48 hours to complete the alignment of the molecules and thereafter is machined to square the flange.

The process may be used for manufacturing a single flare flange adapter of various sizes and dimensions, this process is particularly suitable for producing an adapter having the following dimensions (see FIG. 7):

a pipe diameter ($D_p$) of 2 to 50 inches (5 to 125 cm)

a total height (L) of 4 to 60 inches (10 to 150 cm)

a pipe wall thickness (T) of 0.20 to 3.0 inches (0.50 to 9.5 cm)

a flange thickness ($T_F$) equal to the pipe wall thickness (T)

and a flange diameter ($D_F$) of 1.1 to 1.6 times of the pipe diameter ($D_p$).

A few sizes of the typical single flare flange adapter are shown below (unit:inches).

|  | 1 | 2 | 3 |
| --- | --- | --- | --- |
| Dp | 3½ | 14 | 36 |
| L | 6 | 11 | 41 |
| T | 0.216 | 0.903 | 1.029 |
| $T_F$ | 0.216 | 0.903 | 1.029 |
| $D_F$ | 5⅜ | 17¾ | 41¼ |

What I claim as my invention is:

1. A process for manufacturing a single flare flange adapter from a length of suitable thermoplastic resin tube which process comprises the steps of, heating an end portion of the tube to soften it; arranging said tube in a sleeve member with the heated tube end projecting therefrom; inserting a flanged male plug member into the heated end of said tube and relatively moving said sleeve member and said plug member longitudinally towards each other under pressure to cause said flanged plug member to flare the heated end of the tube outwardly through an obtuse angle against a limiting means to form a single flange on the said tube; cooling the formed flanged tube; removing the flanged tube from said members; and stress relieving the flanged tube.

2. A process as claimed in claim 1 in which cooling of the flanged tube takes place initially whilst pressure is applied and whilst the flanged tube is still engaged between sleeve and plug members and subsequently after removal of pressure and removal of the flanged tube from sleeve and plug members.

3. A process as claimed in claim 2 in which the subsequent cooling is performed by immersing the flanged tube in a cold water tank.

4. A process as claimed in claim 1 in which the outward flaring of the tube results in the formed flange being overbent by between substantially 15° and 30° beyond a plane normal to the longitudinal axis of the tube.

5. A process as claimed in claim 1 in which the stress relieving step comprises constraining the flanged tube between top and bottom clamping discs and heating the flanged tube to a first temperature above ambient and below the softening point of the tube and permitting the clamped tube to cool gradually by steps until the flared tube is stress relieved.

6. A process as claimed in claim 5 in which the cooling is conducted by steps of 10° F. an hour.

7. A process as claimed in claim 6 in which the said first temperature is 160° F. and the flanged tube is cooled to a temperature of about 72° F. over a period of about 8 hours.

8. A process as claimed in claim 1, in which the flanged tube after it has been stress relieved, is permitted to stand for about 48 hours before it is machined.

9. A process as claimed in claim 3, in which the flanged tube after it has been stress relieved, is permitted to stand for about 48 hours before it is machined.

10. A process as claimed in claim 5, in which the flanged tube after it has been stress relieved, is permitted to stand for about 48 hours before it is machined.

11. A process as claimed according to claim 5 in which the overbent flange is constrained by the clamps at an overbend between 15° and 30° beyond a plane normal to the longitudinal axis of the tube during the stress relieving.

12. A process as claimed according to claim 6 in which the overbent flange is constrained by the clamps at an overbend between 15° and 30° beyond a plane normal to the longitudinal axis of the tube during the stress relieving.

13. A process as claimed according to claim 7 in which the overbent flange is constrained by the clamps at an overbend between 15° and 30° beyond a plane normal to the longitudinal axis of the tube during the stress relieving.

14. Apparatus for forming a single flare flange on a heated end of a thermoplastic tube comprising a sleeve member for receiving the tube with the heated end thereof projecting from the sleeve, said sleeve having an end flange with a rearwardly receeding outer face a flanged male plug member dimensioned so as to enter, in operation, the heated end of the tube and by relative inward longitudinal movement between sleeve and plug to flare the heated end of the tube outwardly between the flanges of sleeve and plug; and an outer retaining member adapted to embrace the flanges of plug and sleeve and, in operation, limit the outward flow of the flange being formed, beyond the edges of the flanges of sleeve and plug.

15. Apparatus as claimed in claim 14 in which said outer face of the flange of the sleeve member recedes outwardly from the sleeve mouth at an angle of between substantially 15° and 30° beyond a plane normal to the longitudinal axis of the sleeve.

16. Apparatus as claimed in claim 10 in which the underface of the flange of the plug member is tapered outwardly forwardly from the plug body at an angle of between about 15° and 30° beyond a plane normal to the longitudinal axis of the plug.

17. Apparatus as claimed in claim 11 in which the underface of the flange of the plug member is tapered outwardly forwardly from the plug body at an angle of between about 15° and 30° beyond a plane normal to the longitudinal axis of the plug.

18. Apparatus as claimed in claim 14 in which the outer retaining member is of circular cylindrical form of inner diameter slightly greater than the outer diameter of sleeve or plug flanges.

* * * * *